United States Patent [19]
Reese

[11] Patent Number: 6,098,524
[45] Date of Patent: Aug. 8, 2000

[54] HOT BEVERAGE VENDING MACHINE

[75] Inventor: Robert J. Reese, St. Charles, Mo.

[73] Assignee: Crane Co., Stamford, Conn.

[21] Appl. No.: 09/154,432

[22] Filed: Sep. 16, 1998

[51] Int. Cl.⁷ .................................................. A47J 31/00
[52] U.S. Cl. ........................... 99/280; 99/289 R; 99/290; 222/146.5; 222/129.4
[58] Field of Search .............................. 99/280, 281, 282, 99/283, 289 R, 290; 222/129.3, 129.4, 146.5, 145.6

[56] References Cited

U.S. PATENT DOCUMENTS

| Re. 31,352 | 8/1983 | Kueser et al. ............................. 99/283 |
| 4,649,809 | 3/1987 | Kanezashi .................................. 99/290 |
| 5,265,518 | 11/1993 | Reese et al. .............................. 99/280 |
| 5,303,639 | 4/1994 | Bunn et al. ............................ 99/289 R |
| 5,344,050 | 9/1994 | Ficken ................................ 99/289 R X |
| 5,353,692 | 10/1994 | Reese et al. ........................... 99/289 T |
| 5,941,163 | 8/1999 | Park et al. ......................... 99/289 R X |

*Primary Examiner*—Reginald L. Alexander
*Attorney, Agent, or Firm*—Senniger, Powers, Leavitt & Roedel

[57] ABSTRACT

A hot beverage vending machine adapted for making coffee drinks from a freeze dried mixture by utilizing mixing bowls and delivery tubes surrounded by a heater shroud. A smooth edge whipper is utilized to whip the coffee mixture to the proper consistency after it leaves the mixing bowl to provide the proper crema appearance in the cup. The mixture is directed into a cup by an adjustable outlet tube so that the coffee mixture is directed against the side of the cup below the full line. The adjustable outlet tube also contributes to the proper drink appearance by reducing the number of large bubbles in the cup.

15 Claims, 6 Drawing Sheets

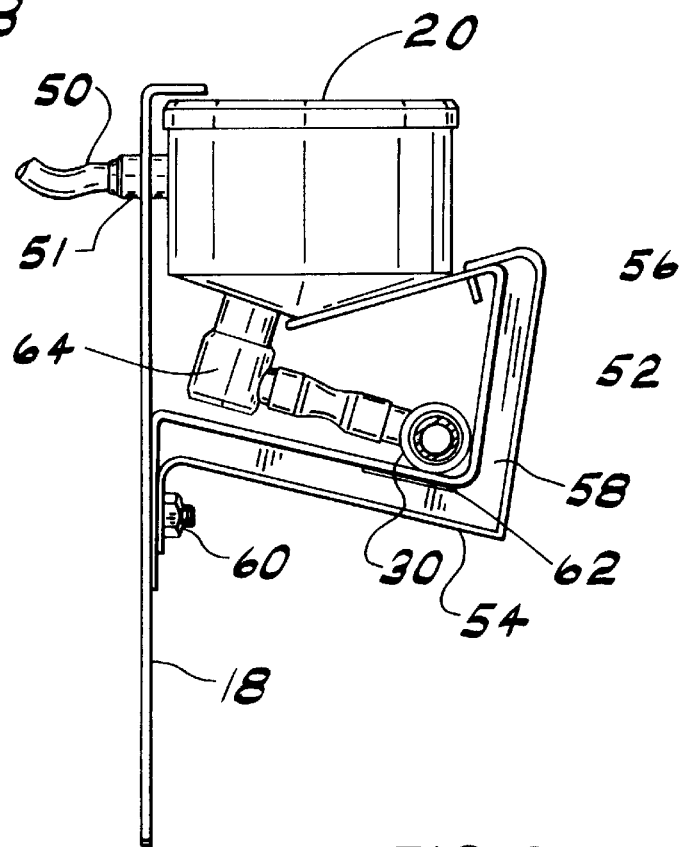
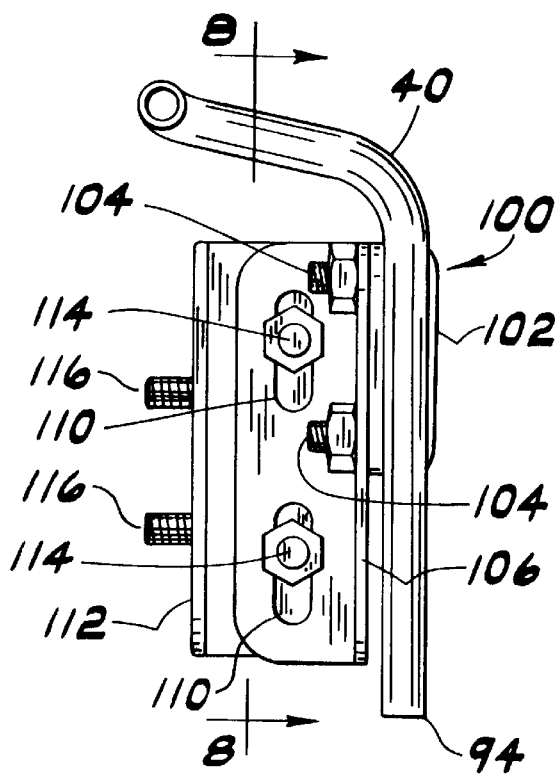
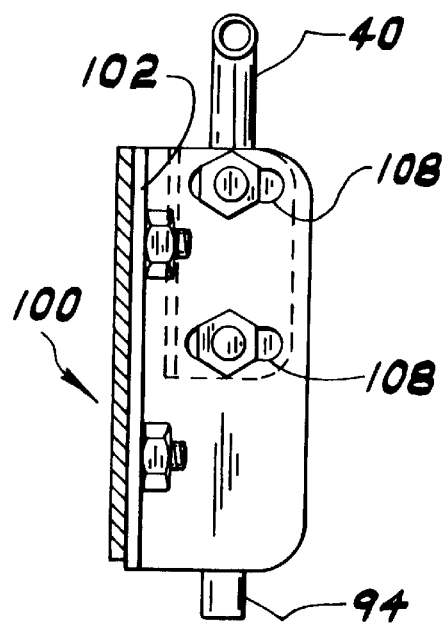

HOT BEVERAGE VENDING MACHINE

BACKGROUND OF THE INVENTION

The present invention relates to vending machines and more particularly to vending machines which vend hot beverages such as coffee and tea.

Different hot beverages require different brewing cycles, temperatures and mixtures to produce a desired product. For example, espresso coffee is preferably delivered to a cup at a temperature of at least 149° F. (65° C.) and should have certain appearance attributes which are expected by a customer who purchases such a product. If these requirements are not met, it is likely that a customer will not make future purchases of the product from the vending machine.

Unfortunately, many hot beverage vending machines currently available are not designed to produce espresso coffee at the desired temperature from the very first cup taken from the machine, without increasing the hot water reservoir temperature too high. Also, they do not provide the desired appearance attributes in the cup, for example, the proper thickness and consistency of crema (foam or cream) on the surface of the coffee, because of the way in which the product is produced and delivered to the cup.

In addition, in high humidity geographic locations, the use of freeze dried coffee, particularly espresso coffee, the product canister dispensing nozzles, the delivery tubes and mixing bowls which prepare and deliver the espresso mixture to the cup, tend to clog and require frequent service and cleaning.

SUMMARY OF THE INVENTION

The present invention overcomes the above described difficulties and disadvantages associated with prior art hot beverage vending machines for producing espresso coffee by providing a machine that delivers the coffee at the desired temperature and provides the desired appearance of the drink in the cup. The vending machine of the present invention is designed to provide heating and insulation of the delivery and supply tubes of the hot water and coffee mixture as it passes through the machine so that the basic hot water reservoir temperature is maintained at its normal temperature of approximately 185° F. (85° C.) and yet delivers the mixture to the cup at the desired temperature of at least 149° F. (65° C.). In addition, the mixture is whipped through a whipper assembly which imparts the desired foam to the mixture and it is then delivered to the cup so that the flow of mixture from the delivery tube directed against the side of the cup below the full line but above the bottom so the desired foam appearance in the cup is achieved. Also, it has been discovered that heating the area around the product canister dispensing nozzles, mixing bowls and delivery tubes substantially reduces clogging of those areas when freeze dried espresso coffee, as well as other drinks, are being prepared in the machine.

To achieve the above mentioned results the present invention provides a vending machine for vending hot liquid drinks which includes a hot water tank having an outlet; a hot water metering device connected to the outlet of the hot water tank for supplying a predetermined quantity of hot water; a product canister having an outlet; a product and hot water mixing bowl; a hot water delivery tube connecting the hot water metering device with the mixing bowl to supply a predetermined quantity of hot water to the bowl; a product metering device connected to the outlet of the product canister for supplying a predetermined amount of product to the mixing bowl; a whipper mechanism for whipping the mixture; a mixture delivery tube connected to the mixing bowl and whipper mechanism to supply the whipper mechanism with the mixture; a heater shroud covering a substantial portion of the mixture delivery tube for heating the mixture passing therethrough to maintain it at a predetermined temperature; a cup station; and a mixture output tube connected to the whipper mechanism and delivering the mixture therefrom to the cup station.

The present invention also provides such a vending machine wherein the mixture output tube has an outlet end adjacent the cup station disposed to direct the mixture into a cup positioned in the cup station so that the stream of mixture engages the side of the cup at a position below the final mixture surface level in the cup and above the bottom of the cup. Also, in its preferred form the present invention provides that the heater shroud includes an elongate sheet metal contoured strip and at least one strip heater attached thereto and extending for a substantial portion of the length of the delivery tube in engagement therewith.

The vending machine of the present invention also includes a whipper mechanism having a cylindrical whipper with smooth side walls and an annular-shaped outer circumferential surface and mounted for rotation about its central axis; a cylindrical housing closed at both ends and containing the whipper and axially aligned therewith and having an interior circumferential wall in close proximity to the outer circumferential surface of the whipper providing a circumferential passage therebetween through which the mixture can pass so as to provide the desired whipping, a mixture inlet disposed on one side of the whipper and a mixture outlet disposed on another side of the whipper. In addition, the whipper mechanism preferably includes a removable plug closing one end of the cylindrical housing and having an inner surface in close proximity to the other side of the whipper adjacent the outlet. The mixture outlet is preferably smaller than the mixture inlet and the output tube is smaller than the mixture delivery tube, to reduce any additional foaming that might otherwise occur.

BRIEF DESCRIPTION OF THE DRAWINGS

FIG. 3 is an end view of the heater shroud of FIG. 2;

FIG. 7 is a side view of the mounting for the mixture delivery tube in the cup station; and FIG. 8 is a view in the direction of line 8—8 on FIG. 7.

DETAILED DESCRIPTION OF THE PREFERRED EMBODIMENT

Figure 1:
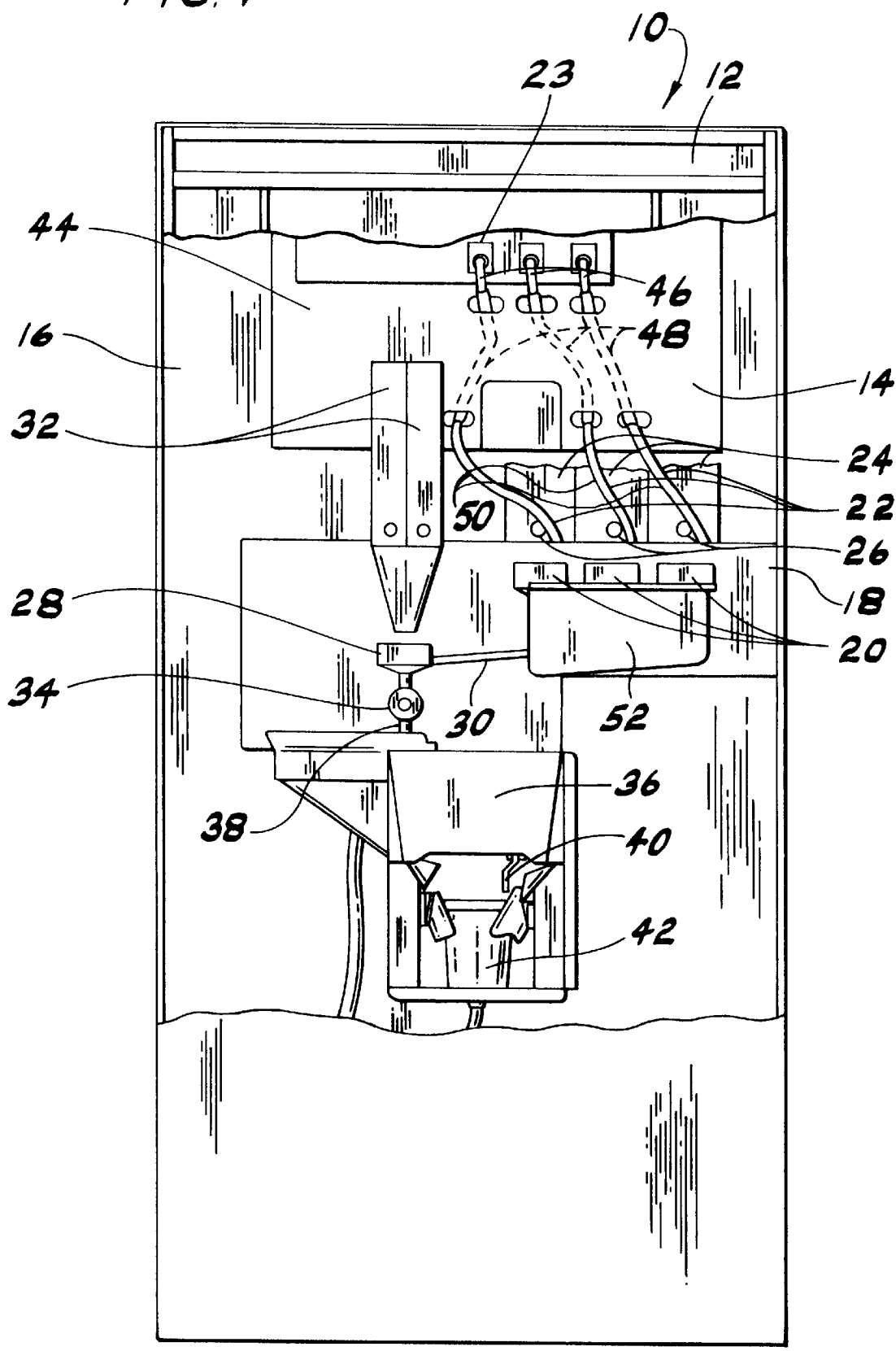
FIG. 1 is a front elevational view partially cut away to show the interior of the preferred embodiment of the present invention.

A hot drink/coffee vending machine 10 is shown in FIG. 1. It's external appearance is of a conventional coffee vending machine with its outer service door 12 partially cutaway to show the construction of the preferred embodiment of the present invention. Generally, the vending machine includes a hot water tank 14 positioned in the upper portion of the vending machine and which is of a generally rectangular construction and fastened to the rear wall 16 of the vending machine.

Mounted in the machine to a bracket 18 in front of and below the tank 14 are a plurality of product and water mixing bowls 20. Hot water supply lines 22 supply each of the mixing bowls 20 with hot water. Each of the supply lines 22 is connected to a respective metering solenoid dispensing valve 23 which provides the desired amount of hot water from the tank 14 to prepare a cup of coffee or the like. Respective product storage canisters 24, mounted within the vending machine 10 and shown with their tops as partially cutaway, supply a predetermined amount of product, such as freeze dried coffee, to the respective mixing bowl 20 via a nozzle 26 which drops a predetermined amount of product into the open upper portion of the respective mixing bowl 20.

Mixing bowls 20 are of a generally conventional construction as disclosed, for example, in U.S. Pat. No. 5,192,002 assigned to the same assignee as the present invention.

A further mixing bowl 28, of the same general construction as mixing bowls 20, is mounted to bracket 18 and receives through a mixture delivery tube 30 the mixture from any of the mixing bowls 20. Condiment storage canisters 32 are positioned above mixing bowl 28 for supplying condiments, such as lightener or sugar, to the mixture, if required, which is then mixed in the mixing bowl 28. The mixture, either with or without any added condiment, then passes from mixing bowl 28 into a whipper mechanism 34 which, when activated for certain mixtures, whips the mixture to a desired consistency. After whipping, the mixture then passes to the cup station 36 through a mixture delivery tube 38 that supplies the mixture through a mixture output tube 40 to a cup 42 positioned in the cup station 36.

Hot water tank 14 is provided with an insulated cover 44 surrounding at least the front portion of the hot water tank 14 for reducing heat loss. To this end, the hot water supply tubes 22 have flexible tubing such as silicone tubing 46, connected to the output of the metering solenoid dispensing valves 23 and connecting to respective stainless steel tubing portions 48 which extend between the insulation and the tank 14 in engagement therewith so as to reduce heat loss as the hot water passes from the tank 14 to the mixing bowls 20. As the stainless steel tubing portions 48 exit the insulated covering 44 further flexible silicone tubing 50 connects the stainless steel tubing portions 48 to the inlets 51 (see FIG. 3) of respective mixing bowls 20.

Figure 2:
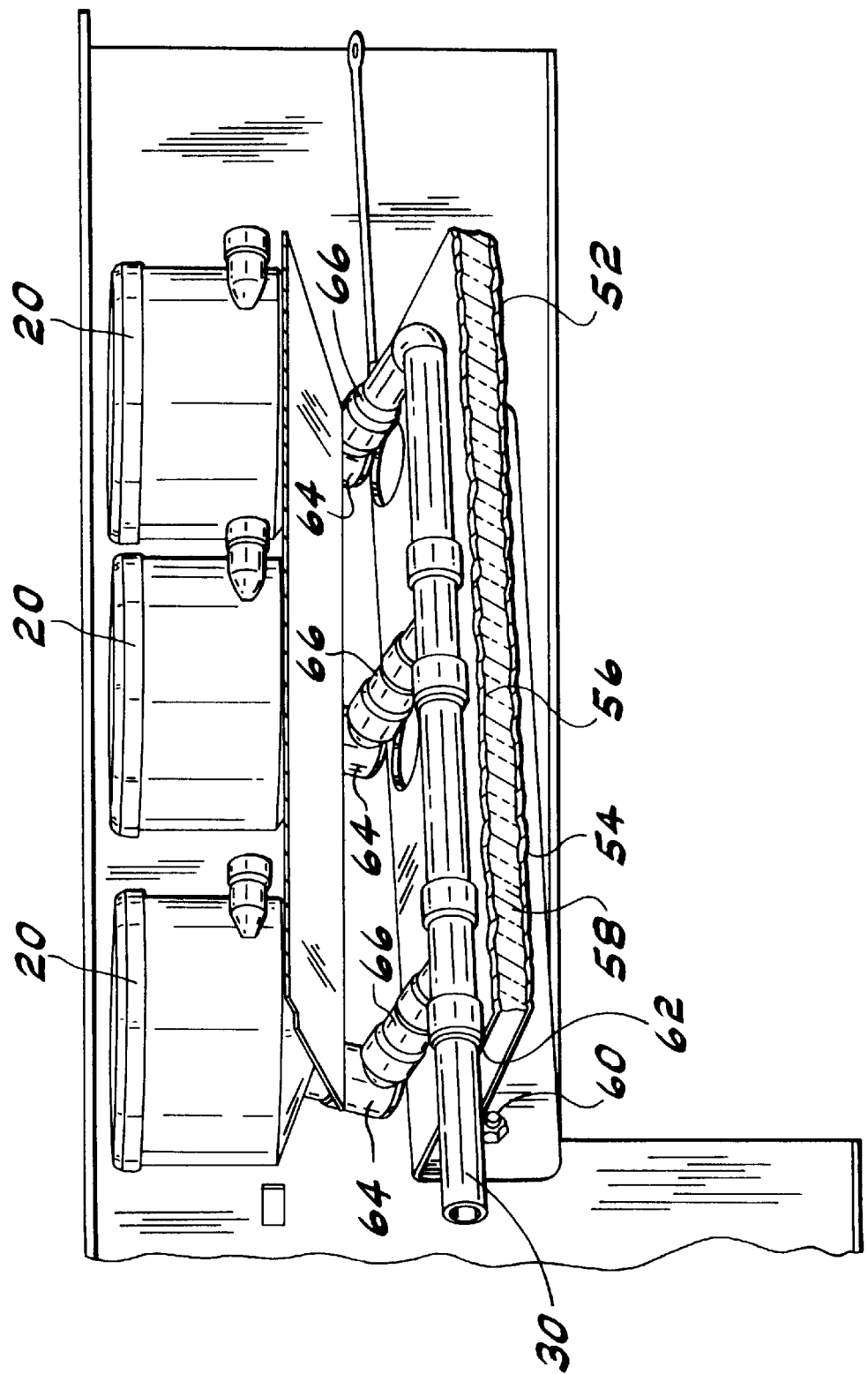
FIG. 2 is an enlarged front view in partial cross-section, of the heater shroud around the mixing bowls and deliver tubes of the preferred embodiment.

Surrounding tube 30 at the base of the mixing bowls 20 is a heater shroud 52 which is essentially an elongated contoured sheet metal strip. As best seen in FIGS. 2 and 3, shroud 52 is formed of an outer sheet metal plate 54 and inner sheet metal plate 56 and a layer of insulation 58 sandwiched between the plates. The plates are held together by bolts 60. The shroud 52 is fastened to the bracket 18 such as by thumb screws (not shown). An upper sheet metal cap plate 62 closes the upper portion of heater shroud 52, forming part thereof, and engages the lower conical surfaces 64 of mixing bowls 20 to produce some heating of the bowls. A heater strip 62 of conventional construction, also forming part of the heater shroud 52, is mounted to the bottom surface of the inner plate 56 and is in engagement with the inner plate 56 which is, in turn, engaged with mixture delivery tube 30 along a substantial portion of its length within the shroud in order to heat the tube. Thus, as mixture leaves the exit tube 64 of any of the mixing bowls 20 through the connector tubes 66 and enters the tube 30 the mixture is heated to maintain the temperature of the mixture at a desired level, such as the 149° F. (65° C.) minimum desired for making espresso coffee. As one skilled in the art would realize, the thickness of the insulation 58, temperature of heating strip 62 and general configuration of the heater shroud 52 can be adjusted to achieve the desired output temperature of the mixture through mixture delivery tube 30. It is also notable that the heater shroud substantially reduces the clogging of product in the delivery nozzles of product storage canister 24, mixing bowls 20 and tube 30 from a build up of unmixed freeze dried coffee and moisture when it is used in geographically humid areas. This advantage is attained as a result of the heating of the air around these components which reduces the moisture in the air in the immediate area of the components. This provides a substantial advantage by reducing necessary service calls to clean out the clogged areas.

Figure 4:
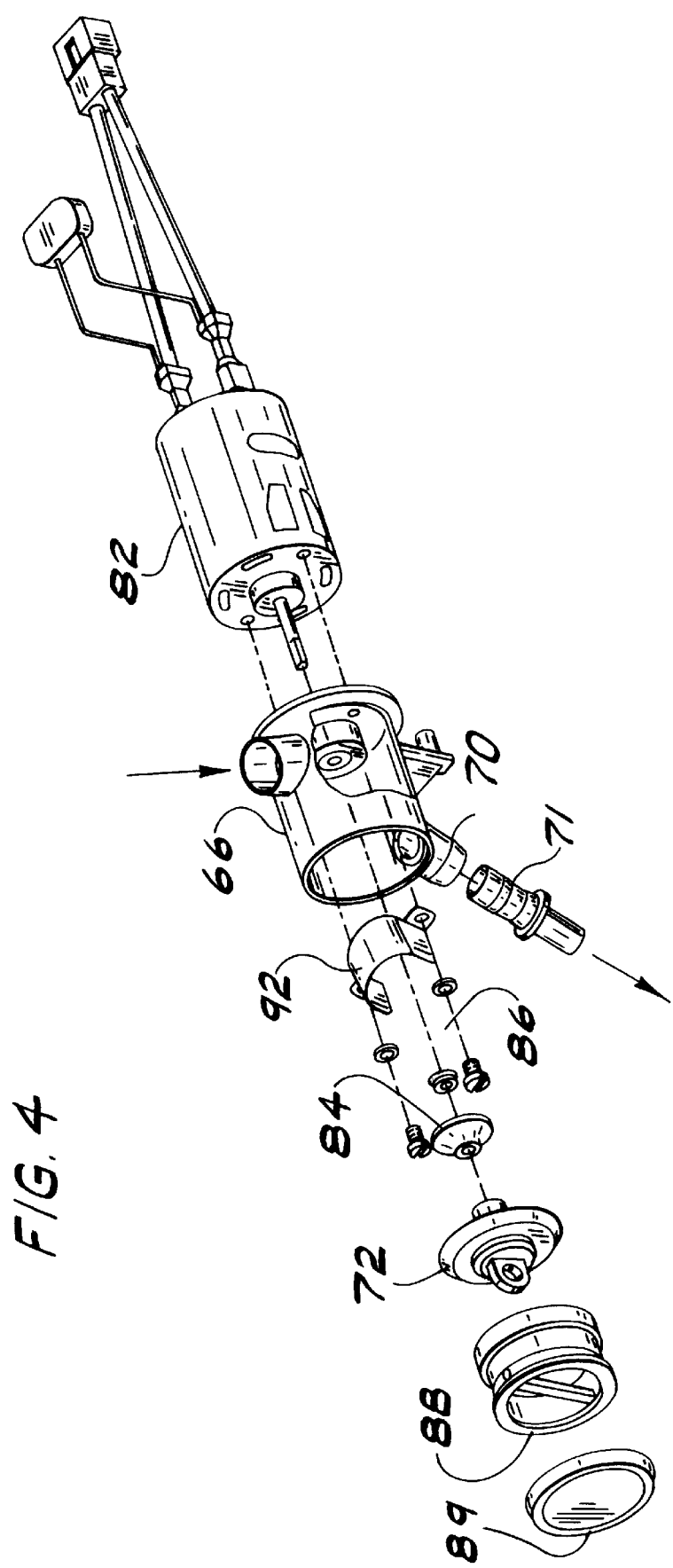
FIG. 4 is an expanded view of the whipper assembly of the preferred embodiment.
Figure 5:
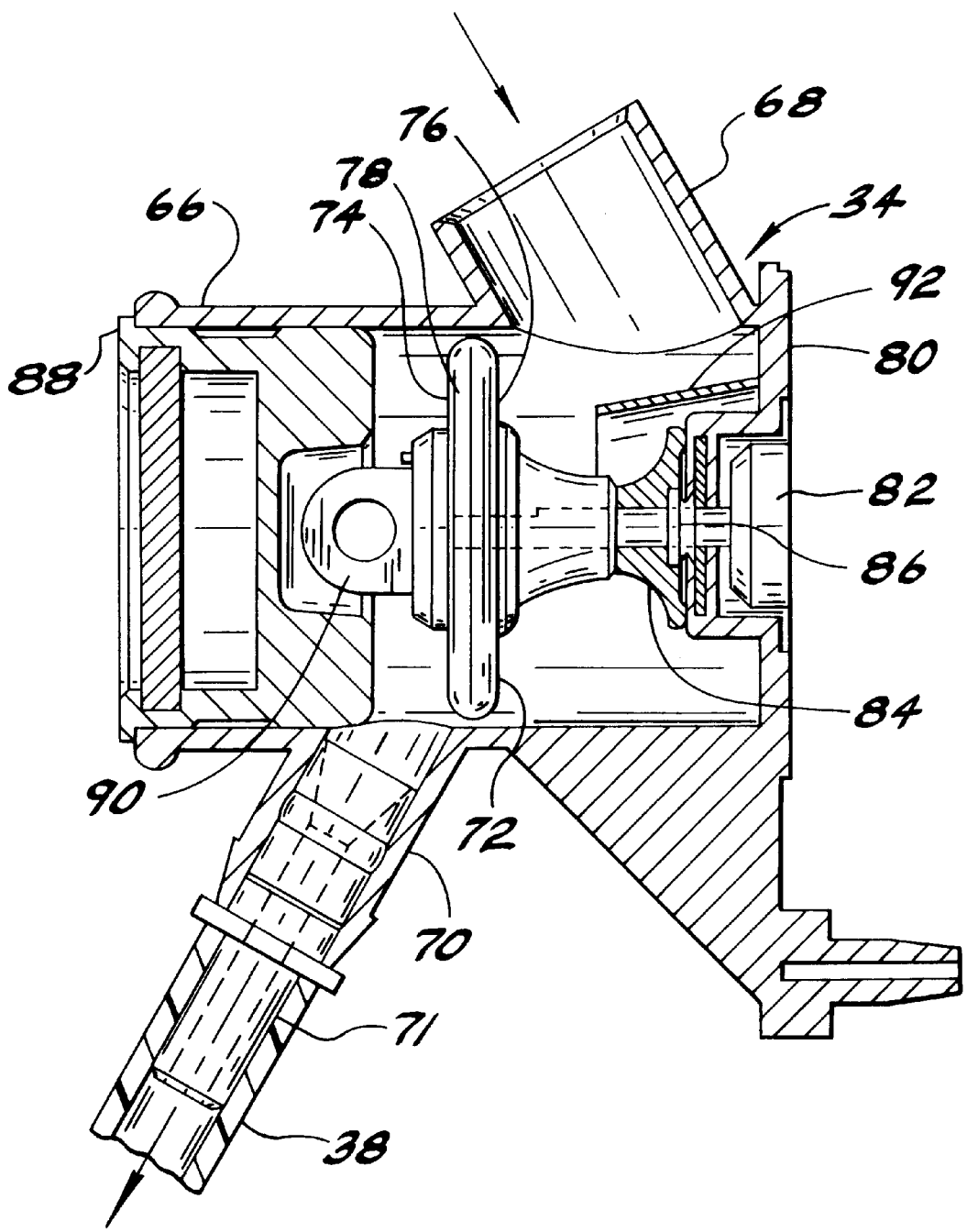
FIG. 5 is a cross-sectional view through the central axis of the whipper assembly, without the end cap.

After the mixture is delivered to the mixing bowl 28 and condiment added or not as selected by the customer, the mixture then passes to the whipper mechanism 34. As best seen in FIGS. 4 and 5, the whipper mechanism 34 includes a generally cylindrical housing 66 with a mixture inlet 68 and mixture outlet 70 with an adaptor 71. The whipper 72 has smooth sidewalls 74 and 76 and an annular shaped outer circumferential surface 78 which extends adjacent the inner cylindrical sidewall of housing 66. The clearance between the outer circumferential surface 78 of whipper 72 and the inner circumferential surface of housing 66 is adjusted to provide the desired amount of "crema" (foam or cream on top of the coffee in the cup) in the mixture when delivered to the cup. This may require some adjustment in a particular construction, but for the purpose of the preferred embodiment it was determined that satisfactory results were obtained if the whipper circumferential diameter was 1.180 inches, the internal diameter of the cylindrical housing 66 in the area of the whipper was 1.250 inches, the inside diameter of adaptor 71 was 0.140 inches and the tubing 38 had an inside diameter of ³⁄₁₆ inches. The criteria for establishing these dimensional relationships was that the crema on the mixture delivered to the cup must be less than approximately two millimeters in thickness and with relatively small bubbles in the crema layer.

Cylindrical housing 66 is enclosed at both ends. As seen in FIG. 5, a rear wall 80 encloses one end of housing 66 except for the passage of the drive shaft of drive motor 82 through the rear wall which is sealed by seals 84 and 86 against leakage of the mixture through the rear wall. The front of the cylindrical housing 66 is sealed by a plug 88 which is frictionally fitted in the end of the housing 66, and a further seal is provided by a removable elastomeric cap 89 which fits over the end of the housing. The plug 88 is removable so that the whipper mechanism 34 can be cleaned. Once the plug 88 is removed the whipper 72 can be removed by engaging a hook tool in the eye 90 provided on the end of whipper 72 for this purpose. It is to be noted that the level of mixture within the whipper mechanism 34 generally never reaches the level where it would be engaged by the eye 90 and the whipping action affected thereby. Also, contained within housing 66 and mounted to the rear wall 80 is a splatter shield 92. As the mixture enters the whipper mechanism 34 through the inlet 68 it impinges upon shield 92 and is directed away from the seals 86 and 84 down around the internal circumferential surface of housing 66.

Figure 6:
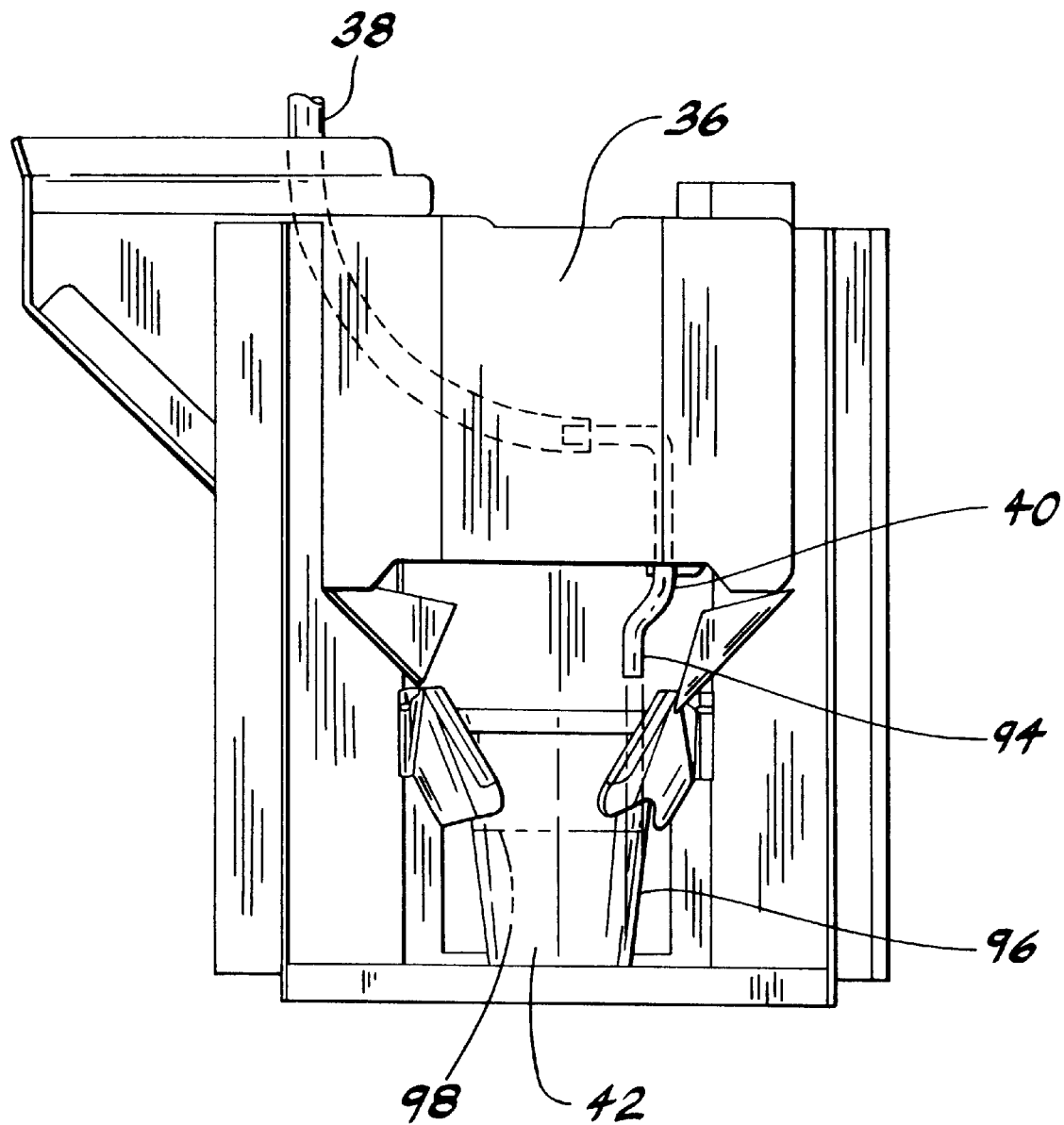
FIG. 6 is an enlarged view of the cup station of the embodiment of FIG. 1 with a cup in position for receiving liquid.

After the mixture leaves the whipper mechanism 34 through adaptor 71 and mixture delivery tube 38 it is carried to the mixture output tube 40 where it is delivered to the cup. As best seen in FIGS. 6 through 8, the mixture output tube 40 is so positioned and arranged in the cup station 36 that the mixture exits the output end 94 of tube 40 so that it is directed down the side 96 of the cup 42. It is also directed to engage the side 96 of cup 42 at a position below the final filling level 98 of the mixture in cup 42 in order to minimize the appearance of drink mixture marking above the full level inside the cup. The mixture is also directed against the side of the cup so that it does not directly impinge on the inside bottom of the cup since this produces undesirable formation of larger bubbles. To achieve the adjustment desired on directing the mixture against the side of the cup an adjustable output tube support bracket 100, as shown in FIGS. 7 and 8, is provided. Mixture output tube 40 is welded or otherwise secured to a first L-shaped bracket 102 in which threaded studs 104 are mounted. A second L-shaped bracket 106 is provided with a pair of laterally elongated holes 108 and a pair of vertically elongated holes 110. A third bracket 112 is provided with threaded studs 114 engageable in the holes 110. The studs 104 mounted to bracket 102 are received in the laterally elongated openings 108 and nuts are applied to each of these for securing the output tube in a desired vertical and lateral location. The third bracket 112 is also provided with threaded studs 116 for securement of the bracket to the cup station 36. Thus, once the vending machine 10 is assembled the output tube 40 can be positioned and adjusted so that the mixture impinges on the cup 42 in the desired location as described above.

As an example of operation of the present invention, when a cup of espresso is being prepared, the customer makes his selection and inserts his money into the machine in a conventional manner. Freeze dried espresso product is dispensed from one of the canisters 24 by its associated nozzle 26 into one of the three mixing bowls 20. Simultaneously, the machine controls are operated by software in a microprocessor (not shown) to control the associated solenoid 23 to dispense the measured amount of hot water from the hot water tank 14 into the same mixing bowl 20. The mixture of water and product passes through the mixing bowl 20 and into the mixture delivery tube 30. Tube 30 has been preheated by the heating strip 62 operating continuously to heat the area around the mixing bowls and tube 30.

The mixture then passes into mixing bowl 28 which, in the case of making espresso, generally a condiment from containers 32 is not added, except possibly sugar, and thereafter the mixture passes from mixing bowl 28 into whipper mechanism 34. In the whipper mechanism the mixture passes through the inlet 68 and impinges upon the shield 92 and is then spread into the cylindrical interior of the housing 68 and directed toward the whipper 72. The mixture then passes around the clearance between the outer edge 78 of the whipper and the inner sidewall of housing 66 and is whipped by the whipper as it passes. Starting and stopping of the whipper motor 82 is controlled by the microprocessor programming which is determined by trial and error for a given machine construction to achieve the desired amount of crema in the final mixture in the cup. The mixture then exits the whipper through outlet 70, adaptor passing through the mixture delivery tube 38 to the mixture output tube 40 in cup station 36. The mixture then impinges on the sidewall of cup 42, as shown in FIG. 6, to fill the cup and put the proper appearance of foam on the upper surface of the cup without leaving deposits above the fill line 98 in the cup. Although this is especially good for making espresso, it is also good for making other drinks as well.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vending machine for vending hot liquid drinks, comprising:

a hot water tank having an outlet;

a hot water metering device connected to the outlet of the hot water tank for supplying a predetermined quantity of hot water;

a product canister having an outlet;

a product and hot water mixing bowl;

a hot water delivery tube connecting the hot water metering device with the mixing bowl to supply a predetermined quantity of hot water to the bowl;

a product metering device connected to the outlet of the product canister for supplying a predetermined amount of product to the mixing bowl;

a whipper mechanism for whipping the mixture;

a mixture delivery tube connected to the mixing bowl and whipper mechanism to supply the whipper mechanism with the mixture;

a heater shroud covering a substantial portion of the mixture delivery tube for heating the mixture passing therethrough;

a cup station; and a mixture output tube connected to the whipper mechanism and delivering the mixture therefrom to the cup station.

2. The vending machine of claim 1 wherein the mixture output tube has an outlet end adjacent the cup station disposed to direct the mixture into a cup positioned in the cup station so that the stream of mixture engages the side of the cup at a position below the final mixture surface level in the cup.

3. The vending machine of claim 1 wherein the heater shroud includes an elongate sheet metal contoured strip and at least one strip heater attached thereto and extending for a substantial portion of the length of the delivery tube in engagement therewith.

4. The vending machine of claim 1 wherein the whipper mechanism includes:

a cylindrical whipper with smooth side walls and an annular-shaped outer circumferential surface and mounted for rotation about its central axis;

a cylindrical housing closed at both ends and containing the whipper and axially aligned therewith and having an interior circumferential wall in close proximity to the outer circumferential surface of the whipper providing a circumferential passage therebetween through which the mixture can pass, a mixture inlet disposed on one side of the whipper and a mixture outlet disposed on another side of the whipper.

5. A vending machine as defined in claim 4 including a removable plug closing one end of the cylindrical housing and having an inner surface in close proximity to the another side of the whipper adjacent the outlet.

6. A vending machine as defined in claim 4 wherein the mixture outlet is smaller than the mixture inlet.

7. A vending machine as defined in claim 6 wherein the output tube is smaller than the mixture delivery tube.

8. A vending machine for vending hot liquid drinks, comprising:

a hot water tank;

a product canister;

a product and hot water mixing bowl;

means for supplying a predetermined amount of hot water from the hot water tank and product from the product canister to the mixing bowl for mixing of the same;

means for whipping the mixture received from the mixing bowl;

means for delivering the mixture from the mixing bowl to the whipping means;

means for heating the mixture delivery means so as to substantially maintain the temperature of the mixture from the mixing bowl to the whipping means;

a cup station; and means for delivering the mixture from the whipping means to the cup station for filling a cup positioned therein.

9. A vending machine as defined in claim 8 wherein the means for delivering the mixture from the whipping means to the cup station is a tube which has an outlet end so positioned and arranged adjacent the cup station to direct the mixture into a cup positioned in the cup station so that the stream of mixture engages the side of the cup at a position below the final mixture surface level in the cup.

10. The vending machine of claim 8 wherein the heating means includes an elongate sheet metal contoured strip and at least one strip heater attached thereto, the delivery means between the mixing bowl and the whipping means being a delivery tube, the contoured strip extending for a substantial portion of the length of the delivery tube in engagement therewith.

11. The vending machine of claim 8 wherein the whipping means includes:

a cylindrical whipper with smooth side walls and an annular-shaped outer circumferential surface and mounted for rotation about its central axis;

a cylindrical housing closed at both ends and containing the whipper and axially aligned therewith and having an interior circumferential wall in close proximity to the outer circumferential surface of the whipper providing a circumferential passage therebetween through which the mixture can pass, a mixture inlet disposed on one side of the whipper and a mixture outlet disposed on another side of the whipper.

12. A vending machine as defined in claim 11 including a removable plug closing one end of the cylindrical housing and having an inner surface in close proximity to the another side of the whipper adjacent the outlet.

13. A vending machine as defined in claim 11 wherein the mixture outlet is smaller than the mixture inlet.

14. A vending machine as defined in claim 13 wherein the output tube is smaller than the mixture delivery tube.

15. A vending machine as defined in claim 8 wherein the means for supplying a predetermined amount of hot water includes stainless steel tubes disposed in heat transfer relation to the hot water tank and an insulative cover covering the steel tubes and adjacent tank portions.

* * * * *